(12) United States Patent
Shaw

(10) Patent No.: US 6,511,594 B2
(45) Date of Patent: Jan. 28, 2003

(54) HIGH OUTPUT OZONATING APPARATUS

(75) Inventor: Donald Shaw, Langley (CA)

(73) Assignee: Northern Research Technologies Inc., Langley (CA)

( * ) Notice: Subject to any disclaimer, the term of this patent is extended or adjusted under 35 U.S.C. 154(b) by 8 days.

(21) Appl. No.: 09/773,506

(22) Filed: Feb. 2, 2001

(65) Prior Publication Data

US 2002/0104788 A1 Aug. 8, 2002

(51) Int. Cl.$^7$ .............................. B01F 15/02; C02F 1/78
(52) U.S. Cl. ...................... 210/120; 210/121; 210/123; 210/192; 96/158; 96/219; 422/186.07; 422/186.14
(58) Field of Search ................................. 210/120, 121, 210/123, 137, 192, 198.1, 194, 748, 760, 764; 422/24, 29, 186.07, 186.14; 137/565.01; 96/157, 158, 193, 219

(56) References Cited

U.S. PATENT DOCUMENTS

| 3,510,265 A | 5/1970 | Kawahata |
| 3,562,349 A | 2/1971 | Pawloski |
| 3,805,481 A | 4/1974 | Armstrong |
| 3,945,918 A | 3/1976 | Kirk |
| 4,230,571 A | 10/1980 | Dadd |
| 4,252,654 A | 2/1981 | Leitzke et al. |
| 4,255,257 A | 3/1981 | Greiner et al. |
| 4,595,498 A | 6/1986 | Cohen et al. |
| 5,032,292 A | 7/1991 | Conrad |
| 5,043,079 A | 8/1991 | Hallett |
| 5,061,377 A | 10/1991 | Lee et al. |
| 5,075,016 A | 12/1991 | Barnes |
| 5,174,905 A | 12/1992 | Shaw |
| 5,968,352 A | * 10/1999 | Ditzler ...................... 210/120 |
| 6,039,884 A | * 3/2000 | Burris et al. ............... 210/192 |
| 6,312,588 B1 | * 11/2001 | Conrad et al. ............. 210/192 |

* cited by examiner

Primary Examiner—Joseph W. Drodge
(74) Attorney, Agent, or Firm—Norman M. Cameron

(57) ABSTRACT

An apparatus for treating water with ozone includes a first conduit and a passageway for admitting ozone into the first conduit. There is a second conduit having a top, an inlet connected to the first conduit and an outlet. There is a third conduit having a top and a vertical portion extending downwardly adjacent to the outlet of the second conduit. The third conduit has a bottom with an outlet below the outlet of the second conduit. The outlet of the second conduit is no more than one-third the distance from the top of the third conduit to the outlet of the third conduit. There is a passageway connecting the third conduit to the first conduit above the outlet of the second conduit. The passageway is sized to permit a reduced flow of water through the third conduit compared to the flow through the second conduit and provides means for gas discharged from the outlet of the second conduit to rise through the vertical portion of the third conduit to increase dissolving of the gas in the water. There is a pump for pumping water with sufficient force from the outlet of the second conduit such that a stream of water and undissolved gas therefrom reaches a point at least one-half the distance from the outlet of the second conduit to the outlet of the third conduit.

7 Claims, 3 Drawing Sheets

HIGH OUTPUT OZONATING APPARATUS

BACKGROUND OF THE INVENTION

This invention relates to an apparatus and method for treating water with ozone, particularly for drinking water and ice making.

It has been well known for many years that water can be purified of harmful organisms by treating it with ozone. However, there is a problem in trying to dissolve ozone in the water to purify it and yet not discharge a significant portion of unreacted ozone from the water, thus wasting it and potentially creating a health hazard.

Four types of gas-liquid contactors have been used for this purpose including spray towers, where liquid is dispersed in a gas, packed beds, bubble plates or sieve towers, and finally units for dispersing gas bubbles in a liquid.

Many of the apparatuses have been designed for industrial purposes, but are not well adapted for use where a relatively compact unit is required for the continuous production of purified water, such as in association with an in-store ice maker or an in-home water purifier.

The use of loop reactors for processes involving liquids and gases has been suggested in such earlier references as U.S. Pat. No. 3,562,349 to Pawloski. In this reference, a pump circulates liquid about a closed loop with inlets and outlets including a gas outlet at the top of the unit.

U.S. Pat. No. 4,252,654 to Leitzke relates specifically to treating water with ozone. Here the water circulated about the loop is split into separate paths for treatment. Only a portion of the total flow of water is treated with ozone by one pass only about the loop. A packed column is employed with a portion of the water sprayed from the top.

Another apparatus for treating water with ozone by circulating it about a loop is shown in U.S. Pat. No. 3,945,918 to Kirk. There is a turbulent zone for mixing the water with ozone as well the setting up of a counterflow of ozone through the water.

My earlier U.S. Pat. No. 5,174,905 discloses a significantly improved ozonator compared with the prior art. However, the efficiency of this ozonator is limited by the maximum flow of water therethrough. It has been found that the flow restriction is due to a number of factors. One of these is the configuration of the restrictor employed for diverting water from the first conduit to the second conduit. Another factor is that if flow was increased too much, the water discharged from the second conduit was expelled from the apparatus along with any excess ozone contained therein.

Accordingly, it is an object of the invention to provide an improved ozonating apparatus which can handle a significantly larger volume flow of water through the ozonator compared with prior art devices of a similar size.

It is also an object of the invention to provide an improved ozonating apparatus which better controls release of excess ozone therefrom.

It is also an object of the invention to provide an improved ozonating apparatus which achieves a more laminar flow of water compared with prior art devices.

SUMMARY OF INVENTION

In accordance with these objects, there is provided according to one aspect of the invention, an apparatus for treating water with ozone which includes a first conduit and a passageway for admitting ozone into the first conduit. There is a second conduit having a top, an inlet connected to the first conduit and an outlet. There is a third conduit having a top and a vertical portion extending downwardly adjacent to the outlet of the second conduit. The third conduit has a bottom with an outlet below the outlet of the second conduit. There is a passageway connecting the third conduit to the first conduit above the outlet of the second conduit. The passageway is sized to permit a reduced flow of water through the third conduit compared to the flow through the second conduit and provides means for ozone discharged from the outlet of the second conduit to rise through the vertical portion of the third conduit to increase dissolving of the ozone in the water. There is a pump with sufficient capacity to force a stream of water and undissolved ozone from the outlet of the second conduit so said stream reaches a point at least one-half the distance from the outlet of the second conduit to the outlet of the third conduit, but less than the distance from the outlet of the second conduit to the outlet of the third conduit, before the undissolved ozone circulates upwardly.

The apparatus may include a restrictor for diverting water from the first conduit into the second conduit, the first conduit including an elbow connected to to the second conduit, the elbow of the first conduit having a curved interior with an inside radius, the restrictor having a curved interior which is aligned with the interior of the elbow of the first conduit and forms a smooth curve with the inside of the elbow of the first conduit adjacent to the inside radius.

Preferably the apparatus forms a loop with a conduit extending from near the outlet of the second conduit to the pump.

There may be an outlet for gas near the top of the loop.

In a preferred form of the invention, the second conduit is inside the third conduit.

According to another aspect of the invention an apparatus for treating water with ozone includes a first conduit with a passageway for admitting ozone into the first conduit.

There is a second conduit having an inlet connected to the first conduit and an outlet. There is a third conduit having a top which is above the first and second conduits. The third conduit has a horizontal portion adjacent to the top and a vertical portion extending downwardly from the top.

There is a passageway connecting the third conduit to the first conduit. The passageway is sized to permit a reduced flow of water through the third conduit compared to the flow through the second conduit and provides means for ozone discharged from the outlet of the second conduit to rise through the vertical portion of the third conduit to increase dissolving of the ozone in the water. There is means for pumping water through the conduits. An ozone relief valve at the top of the third conduit is opened by an accumulation of ozone adjacent thereto.

For example, the ozone relief valve may include a float mechanism having a float, the ozone relief valve being opened when the float drops.

The invention offers significant advantages compared to the prior art. By positioning the outlet of the second conduit well above the outlet of the third conduit, the rate of pumping can be significantly increased. This leads to significantly increased ozonating capacity compared to the prior art. If the pumping rate had been increased in earlier apparatuses of the general type, this would have resulted in the undissolved ozone being directed through the outlet of the third conduit and back to the pump, causing cavitation and therefore pump dysfunction. Moving the outlet of the second conduit upwardly, compared to the prior art, allows a stream of water and undissolved ozone sufficient room to move downwardly so that the ozone can begin to bubble upwardly before reaching the outlet of the third conduit.

Employing an ozone release valve actuated by afloat prevents an undesirable accumulation of undissolved ozone at the top of the apparatus which may occur with some prior art devices. Excess ozone is automatically bled off where it can be destroyed by activated carbon or similar utility substances.

The stated above, preferably the restrictor has a curved interior which is aligned with the interior of the elbow of the first conduit and which forms a smooth curve with the inside of the elbow of the first conduit adjacent to the inside radius. This construction provides a much more laminar flow through the restrictor and accordingly allows a substantially increased pumping capacity. The increased pumping capacity leads to substantially increased ozonating capacity.

DESCRIPTION OF THE PREFERRED EMBODIMENTS

Figure 1:
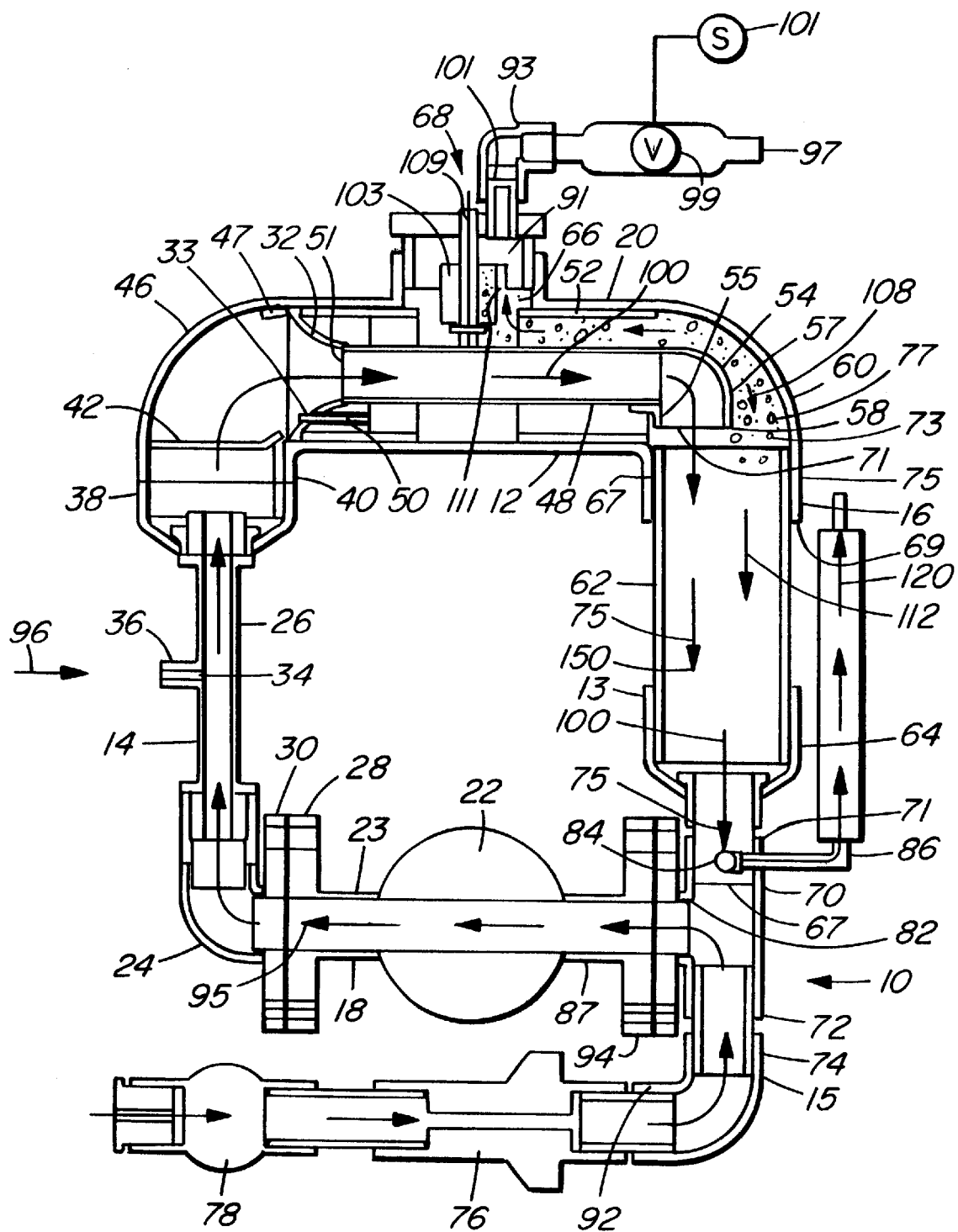
FIG. 1 is a simplified, diagrammatic side elevation of an apparatus for treating water with ozone according to the invention partly in section.

Referring to FIG. 1, this illustrates an apparatus 10 for treating water with ozone. The apparatus is in the form of a continuous loop 12 and is made of a number of different conduits which are interconnected. Ozone resistant metal or plastic are suitable materials to use. Loop 12 has a first, vertical side 14, a second, vertical side 16, a horizontal bottom 18 and a horizontal top 20 in this preferred embodiment. Alternatively the bottom and/or top may be sloped. There is a circulator pump 22 at the bottom of the loop which is connected by conduit 23 to elbow 24 of a first conduit 26 at flanges 28 and 30. In this example the conduit 23 is part of pump 22. A Grundfos UP-15-42SF pump is used in this example, but others resistant to corrosion by ozone could be substituted. The first conduit 26 extends from flange 30 to a reducer 32 at the top of side 14. The bottom portion thereof above elbow 24 comprises a venturi 34 formed by a length of relatively small diameter pipe compared with the portion of the conduit above.

An ozone inlet injector 36 is positioned on the venturi for admitting ozone into the water within loop 12. In this particular example a 3/4" Mazzei 584 injector is used, but others could be substituted depending on such factors as the flow rate. An expander connection 38 connects the venturi to pipe 40 above which, as stated, has a diameter larger than the venturi. A foraminous plate 42 extends across the interior of pipe 40 above the expander connection 38. The plate 42 has a plurality of openings 44 therethrough.

Figure 2:
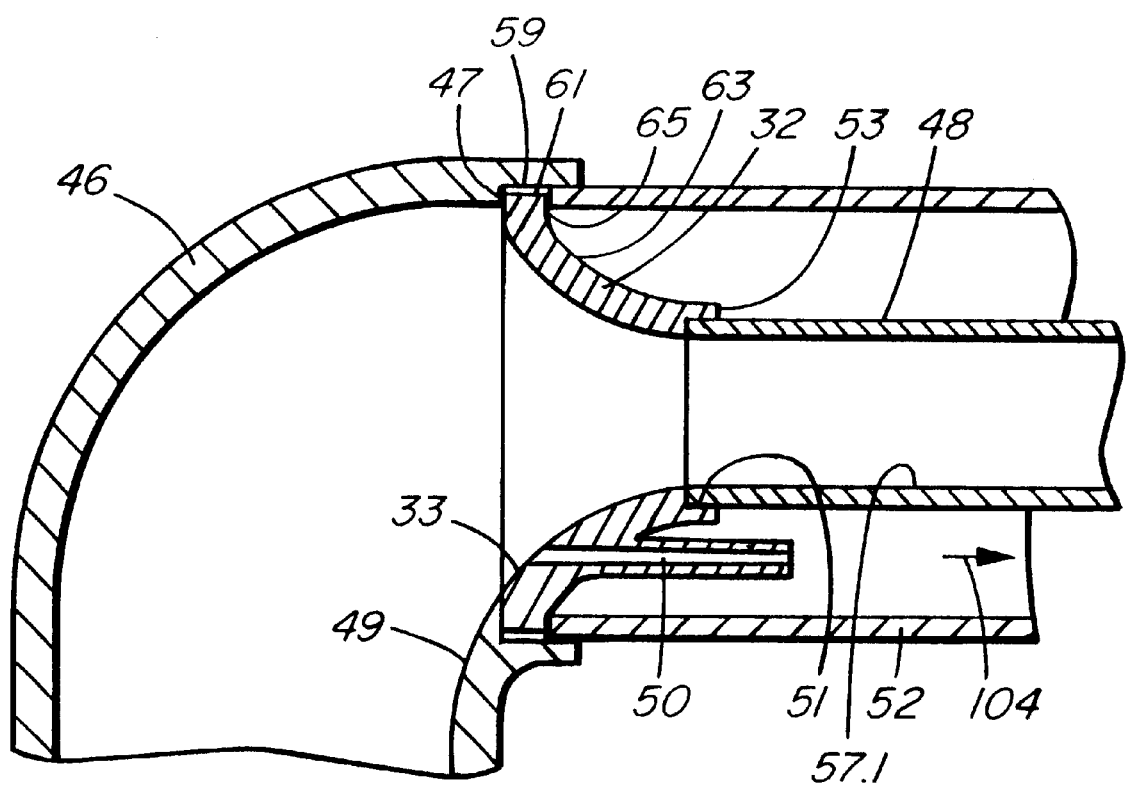
FIG. 2 is an enlarged fragmentary, sectional view of the restrictor thereof with adjacent portions of the first, second and third conduits thereof.

An elbow 46 is connected to the top of pipe 40 and connects side 14 of the loop with top 20 thereof. Reducer 32 is located within the upper end of the elbow and is funnel-shaped inside. The reducer fits tightly within the interior of the elbow to connect it with smaller diameter second conduit 48. There is however a passageway 50 in the reducer 32, as seen in FIG. 2, which communicates with the interior of third conduit 52. There is a similar bore-like passageway adjacent to passageway 50 in this example (not shown). Conduit 52 extends about the conduit 48 and is spaced—apart therefrom.

The reducer 32 butts up against interior shoulder 47 of elbow 46. The reducer has a curved interior surface 33 which aligns with inside curved surface 49 of the elbow at its inner radius. As may be observed, there is a smooth continuous curvature between surface 49 and surface 33. This results in a more laminar flow of fluid from elbow 46 to conduit 48 compared to the prior art and significantly increases the maximum flow through the apparatus.

There is a socket 51 extending inwardly from smaller end 53 of the reducer. Conduit 48 fits snugly within the socket against shoulder 55. It may be observed that the surface 33 of the reducer is aligned with inside surface 57.1 of conduit 48, again leading to smooth, laminar flow.

Conduit 52 fits within the annular space 61 between surface 59 inside the elbow and surface 63 of the reducer. Conduit 52 butts up against shoulder 65 of the reducer.

The second conduit 48 extends across top 20 of the loop to elbow 54 which is connected to a vertical portion 56 of the conduit. The second conduit has an open end 58 at the bottom of vertical portion 56 which forms an outlet for the second conduit.

The third conduit 52 has an elbow 60 extending about elbow 54 of the second conduit and which is connected to a vertical portion 62 of the third conduit as seen in FIG. 1. Portion 62 extends below outlet 58 of the second conduit and is connected to a reducer 64 which forms the lower part of the third conduit.

Outlet 58 of the second conduit is located well above outlet 67 of the reducer 64. In this example the outlet 58 is above bottom end 69 of elbow 60. The exact position of outlet 58 will vary with different embodiments. However the position will generally vary between outlet end 71 of elbow 54 and bottom end 69 of elbow 60.

The loop 12 has an inside 13 and an outside 15. In this embodiment the outlet end 71 of elbow 54 is eccentrically displaced, relative to the elbow of the third conduit, towards the inside 13 of the loop. As may be observed, both elbows 54 and 60 have inner sides 55 and 67 which are adjacent to the inside of the loop. This leaves a wide passageway 73 between outer side 57 of elbow 54 and outer side 75 of elbow 60 for the passage of gas as indicated by bubbles 77. The passage of these bubbles is therefore not blocked by the second conduit 48.

Pump 22 has a sufficiently high output such that the water discharged from outlet 58 is forced downwardly through the vertical portion 62 of the third conduit as indicated by arrows 75. The stream of water containing undissolved bubbles of gas approaches, but does not reach outlet 67 before circulating about the interior of vertical portion 62. Therefore the water containing undissolved gas is not recirculated back through the loop, causing cavitation of the pump. Instead, the gas separates from the gas/water mixture as the water flows down the vertical portion 62 of the third conduit as suggested by arrows 75.1, such that undissolved gas, represented by bubbles 77, can rise vertically. The stream of water containing undissolved gas from outlet 58 is propelled downwardly to a point 150. The exact position of this point will vary from embodiment to embodiment and according to flow rates and the like. However it should be as close as possible to the outlet 67 of reducer 64 without allowing undissolved gas to be propelled directly out of the outlet. In general the point 150 would be at least one-half of the distance from outlet 58 of the second conduit and the outlet 67 of the reducer 64, forming part of the third conduit. However the point must be less than the distance from the outlet of the second conduit to the outlet of the third conduit on the reducer.

There is an opening 66 in third conduit 52 at the top of loop 20. Opening 66 communicates with an off gas control device 68 which serves as an outlet for gas leaving the apparatus. The opening 66 has an interior thread in this example. A threaded plug 91 is fitted within the opening. An elbow 93 is connected to the plug. The elbow in turn is connected to a conduit 95 equipped with an orifice 97. In this example the orifice is 0.024". A valve 99, controlled by a solenoid 101, is located along conduit 95. The solenoid valve is controlled by a float 103. The float is equipped with magnets 107 and is vertically slidable on a shaft 109. A reed switch 111 is actuated when the magnets are adjacent to the reed switch. When the area adjacent to opening 66 of the third conduit becomes filled with gas, the float drops, triggering the reed switch and opening normally closed solenoid valve 99 to release the accumulated gas. Once excess ozone has been released, the float rises and the valve is again closed.

Reducer 64 is connected to first inlet 71 of a T-fitting 70 on the top thereof. There is a second inlet 72 at the bottom of the T-fitting which is connected to a conduit 74 for untreated water. Conduit 74 in this embodiment is provided with a pressure control regulator 76 and an inlet solenoid 78. There is an outlet 84 on the side of T-fitting 70 which is connected to an outlet conduit 86 for treated water. Outlet 82 has a flange 92 which is connected to a flange 94 on pump 22, thus closing the loop.

Figure 3:
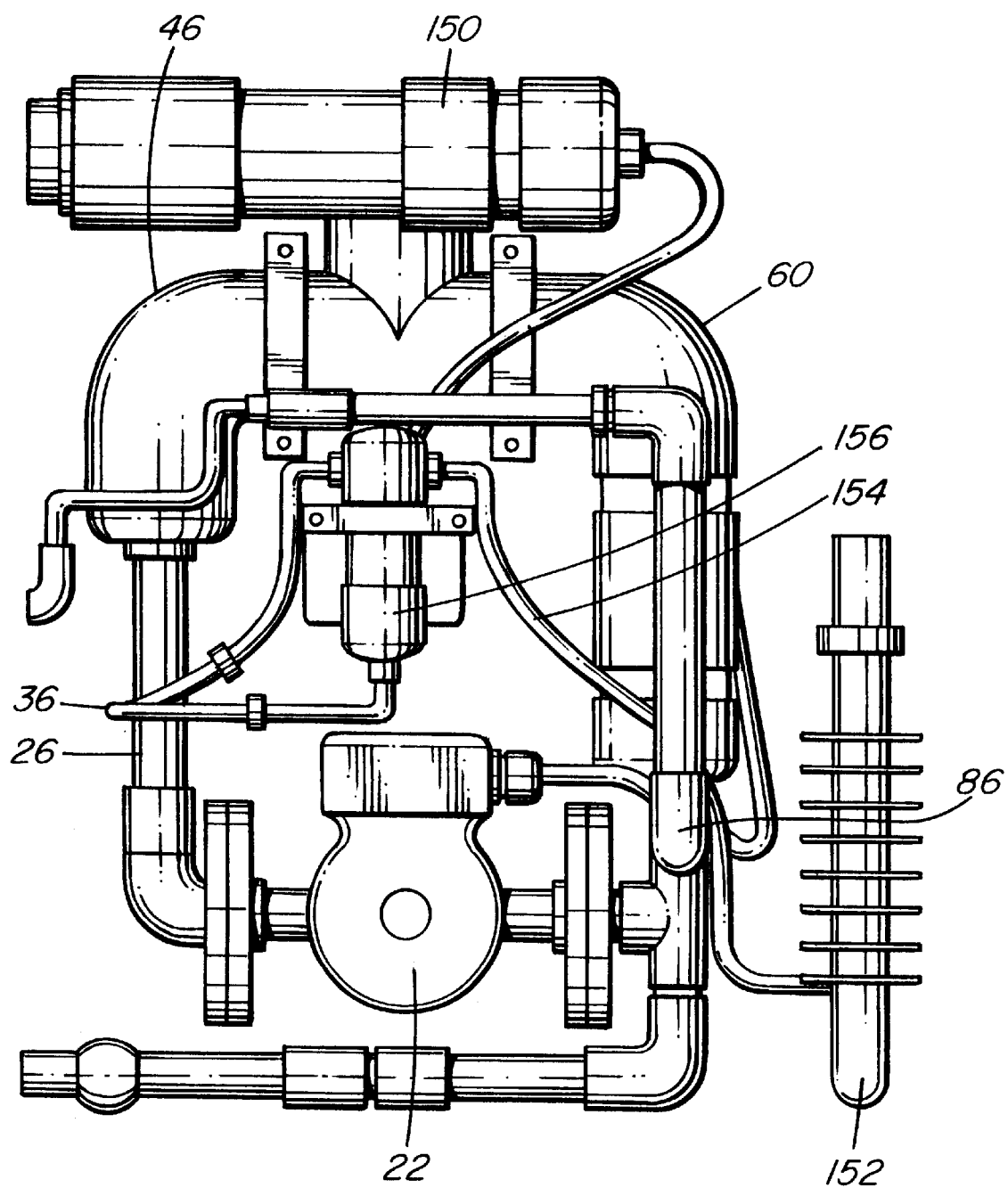
FIG. 3 is a side view of the apparatus.

Some additional components are shown in FIG. 3. This shows an ozone destructor 150, containing activated carbon, which is connected to orifice 97 shown in FIG. 1. Other materials could be used instead of activated carbon. The figure also shows an ozone generator 152 which is connected to the ozone injector 36 by conduit 154. The conduit extends through a solenoid valve 156 which prevents a flow of water back to the ozone generator when the unit is shut off.

The materials used throughout must be resistant to corrosion or degradation caused by ozone. P.V.C., ABS plastic or 316 stainless steel are satisfactory, while aluminum, brass, steel, nylon, neoprene, PTFE and monels are not.

OPERATION AND METHOD

In operation, water to be treated enters the conduit 74 of the apparatus, typically from a water supply, as indicated at arrow 92. The untreated water passes through conduit 74 and is diverted by T-fitting 70 towards pump 22. The pump circulates the water about loop 12, first by pumping it towards venturi 34 as indicated by arrow 95. Ozone is added to the water in venturi 34 through ozone injector 36 as illustrated by arrow 96. Above the venturi the water and ozone are forced through openings 44 in plate 42 which serves to break up the ozone into smaller bubbles and dissolve the ozone in the water.

Beyond elbow 46 the loop is bifurcated with two branches formed by second conduit 48 and third conduit 52. The reducer 32 diverts most of the flow of water and ozone from elbow 46 into the smaller conduit 48. This flow, illustrated by arrow 100, continues down the vertical portion 62 of the third conduit.

Passageway 50 in reducer 32 does permit a flow of water through third conduit 52 in the space between the third conduit and the second conduit as illustrated by the arrow 104 in FIG. 2. This flow is brought about only by the amount of water passing through passageway 50, and therefore flows to the outlet 58 of the second conduit at a reduced linear velocity compared to the water in conduit 48.

When the water is discharged from outlet 58 of the second conduit, it normally has undissolved gaseous ozone still contained therein. It is desirable to further dissolve this ozone in the water to further purify the water and to avoid waste of the ozone which requires treatment before discharging it for safety reasons. When the ozone is discharged from outlet 58, the momentum carries the stream of water containing undissolved gas bubbles to point 150. Since the gas is much lighter than the water, after reaching point 150, it therefore tends to rise in the liquid column contained in vertical portion 62 of third conduit 52 as illustrated by bubbles 77. This counterflow of ozone with respect to the flow of water in the third conduit is further illustrated by arrows 108 pointing upwardly in the third conduit. The gases, which include air with molecular oxygen as well as ozone, move upwardly. Undissolved gases eventually reach the top of the loop where they move through opening 66 to exit the apparatus when the float 103 drops as described above. As the gases move upwardly from outlet 58 of the second conduit to opening 66, additional ozone is dissolved in the water.

The water in the third conduit, and about the second conduit, moves downwardly, as shown by arrows 112, merges with the flow of water from the second conduit and enters T-fitting 70 as illustrated by arrow 100. The majority of the water, or all of it, is then recirculated back through the loop. However, a smaller proportion of the water, indicated by arrow 120, may be diverted into outlet conduit 86 according to demand. This is controlled by a valve (not shown) having an orifice which limits the volume of treated water exiting the system to ensure that only treated water is supplied. Thus it may be seen that the majority of water is recirculated about the loop through conduit 87 for further treatment to purify the water the required amount. In this example the conduit 87 is part of pump 22. Only a fraction of the water is removed through conduit 86 when required on a continual basis as purified water illustrated by arrow 120. The amount of untreated water 92 entering the loop is the same as the amount of treated water leaving through conduit 86 once the loop has been filled to capacity.

It will be appreciated by someone skilled in the art that many of the details provided above are given by way of example only and can be modified without departing from the scope of the invention which is to be determined from the following claims.

What is claimed is:

1. An apparatus for treating water with ozone, comprising:
a first conduit;
a passageway for admitting ozone into the first conduit;
a second conduit having an inlet connected to the first conduit and an outlet;
a third conduit having a top above the first and second conduits, a horizontal portion adjacent to the top, and a vertical portion extending downwardly from the top and an outlet in the vertical portion;
a passageway connecting the third conduit to the first conduit, the passageway being sized to permit a reduced flow of water through the third conduit compared to the flow through the second conduit and providing means for gas discharged from the outlet of the second conduit to rise through the vertical portion of the third conduit to increase dissolving of the gas in the water;

means for pumping water through the conduits; and a gas relief valve at the top of the third conduit which is opened by an accumulation of ozone adjacent thereto, the ozone relief valve including a float mechanism having a float, the ozone relief valve being opened when the float drops.

2. An apparatus as claimed in claim 1, wherein an ozone destruction device is connected to the gas relief valve.

3. An apparatus as claimed in claim 2, wherein the ozone destruction device includes activated carbon.

4. An apparatus for treating water with ozone, comprising:

a first conduit;

a passageway for admitting ozone into the first conduit;

a second conduit having a top, a horizontal portion adjacent to the top thereof and an elbow having a downwardly directed outlet end, an inlet connected to the first conduit and an outlet, the outlet of the second conduit being adjacent to the outlet end of the elbow of the second conduit;

a third conduit having a top, a horizontal portion adjacent to the top, and a vertical portion extending downwardly from the top, an elbow having a top end connected to the horizontal portion of the third conduit and a bottom end connected to the vertical portion, the third conduit having a bottom with an outlet below the elbow of the third conduit, the outlet of the second conduit being between the top of the third conduit and the bottom end of the elbow of the third conduit;

a passageway connecting the third conduit to the first conduit, the passageway being sized to permit a reduced flow of water through the third conduit compared to the flow through the conduit and providing means for ozone discharged from the outlet of the second conduit to rise through the vertical portion of the third conduit to increase dissolving of the ozone in the water;

a pump with sufficient capacity to force a stream of water and undissolved gas from the outlet of the second conduit so said stream reaches a point at least one-half the distance from the outlet of the second conduit to the outlet of the third conduit, but less than the distance from the outlet of the second conduit to the outlet of the third conduit, before the undissolved gas circulates upwardly;

a fourth conduit connecting the third conduit to the pump; and a fifth conduit connecting the pump to the first conduit, whereby the conduits form a loop having an inside and an outside, the outlet end of the elbow of the second conduit being eccentrically displaced, relative to the elbow of the third conduit, towards the inside of the loop.

5. The apparatus as claimed in claim 4, wherein both elbows have inner sides adjacent to the inside of the loop.

6. The apparatus as claimed in claim 4, including a restrictor for diverting water from the first conduit into the second conduit, the first conduit including an elbow connected to the second conduit, the elbow of the first conduit having a curved interior with an inside radius, the restrictor having a curved interior which is aligned with the interior of the elbow of the first conduit and forms a smooth curve with the inside of the elbow of the first conduit adjacent to the inside radius.

7. An apparatus for treating water with ozone, comprising:

a first conduit;

a passageway for admitting ozone into the first conduit;

a second conduit having an inlet connected to the first conduit and an outlet;

a third conduit having a top, a horizontal portion adjacent to the top, and a vertical portion extending downwardly from the top, an elbow having a top end connected to the horizontal portion and a bottom end connected to the vertical portion, the third conduit having a bottom with an outlet below the elbow, the outlet of the second conduit being between the top of the third conduit and the bottom end of the elbow;

a passageway connecting the third conduit to the first conduit, the passageway being sized to permit a reduced flow of water through the third conduit compared to the flow through the second conduit and providing means for ozone discharged from the outlet of the second conduit to rise through the vertical portion of the third conduit to increase dissolving of the ozone in the water;

a pump with sufficient capacity to force a stream of water and undissolved gas from the outlet of the second conduit so said stream reaches a point at least one-half the distance from the outlet of the second conduit to the outlet of the third conduit, but less than the distance from the outlet of the second conduit to the outlet of the third conduit, before the undissolved gas circulates upwardly; and a mechanism for releasing gas adjacent to the top of the third conduit, the mechanism including a valve controlled by a float within the third conduit and a sensor which detects a drop in the float due to an accumulation of gas, the sensor being operatively connected to the valve to open the valve when the float drops.

* * * * *